United States Patent
Tscharnuter et al.

(10) Patent No.: US 11,633,858 B2
(45) Date of Patent: Apr. 25, 2023

(54) METHOD AND SYSTEM FOR SIMULATING A BRAKING OPERATION OF A ROBOT

(71) Applicant: KUKA Deutschland GmbH, Augsburg (DE)

(72) Inventors: Dietmar Tscharnuter, Friedberg (DE); Uwe Bonin, Augsburg (DE); Oliver Klaffenbach, Augsburg (DE); Thomas Rohrer, Grossaitingen (DE)

(73) Assignee: KUKA Deutschland GmbH, Augsburg (DE)

( * ) Notice: Subject to any disclaimer, the term of this patent is extended or adjusted under 35 U.S.C. 154(b) by 220 days.

(21) Appl. No.: 16/762,393

(22) PCT Filed: Oct. 24, 2018

(86) PCT No.: PCT/EP2018/079082
§ 371 (c)(1),
(2) Date: May 7, 2020

(87) PCT Pub. No.: WO2019/096551
PCT Pub. Date: May 23, 2019

(65) Prior Publication Data
US 2020/0384649 A1   Dec. 10, 2020

(30) Foreign Application Priority Data
Nov. 15, 2017   (DE) ..................... 10 2017 010 599.5

(51) Int. Cl.
*B25J 9/16* (2006.01)
*G05B 17/02* (2006.01)

(52) U.S. Cl.
CPC .......... *B25J 9/1674* (2013.01); *B25J 9/1671* (2013.01); *G05B 17/02* (2013.01)

(58) Field of Classification Search
CPC ...... B25J 9/1674; B25J 9/1671; B25J 9/1666; B25J 9/1602; G05B 17/02; G05B 2219/39098
See application file for complete search history.

(56) References Cited

U.S. PATENT DOCUMENTS 8,326,590 B2    12/2012  Kock et al.
10,220,514 B2 *  3/2019  Tronnier ................ B25J 9/1676
(Continued)

FOREIGN PATENT DOCUMENTS

DE   102006055360 A1   6/2007
DE   102007037078 A1   2/2009
(Continued)

OTHER PUBLICATIONS

Andrea Giusti et al, "Efficient Computation of Interval-Arithmetic-Based Robust Controllers for Rigid Robots", 2017 First IEEE International Conference on Robotic Computing (IRC), (Apr. 1, 2017), doi:10.1109/IRC.2017.14, ISBN 978-1-5090-6724-4, pp. 129-135, XP055548197 [A] 4,5 * p. 129 *.
(Continued)

*Primary Examiner* — Jason Holloway
(74) *Attorney, Agent, or Firm* — Dorton & Willis, LLP

(57) ABSTRACT

A method for simulating a braking operation of a robot wherein a dynamic model of the robot is used to determine, for a given initial state of the robot, a final state range with a plurality of possible final states of the robot as a result of the simulated braking operation.

10 Claims, 1 Drawing Sheet

(56) References Cited

U.S. PATENT DOCUMENTS

| | | |
|---|---|---|
| 2003/0225479 A1 | 12/2003 | Waled |
| 2007/0118249 A1 | 5/2007 | Nagamatsu |
| 2009/0319081 A1* | 12/2009 | Kock .................. G05B 19/4061 |
| | | 901/49 |
| 2010/0292843 A1 | 11/2010 | Kariyazaki et al. |
| 2011/0060462 A1 | 3/2011 | Aurnhammer et al. |
| 2016/0176050 A1 | 6/2016 | Tronnier et al. |
| 2017/0232614 A1 | 8/2017 | Takeda |
| 2017/0274528 A1 | 9/2017 | Inaba et al. |
| 2021/0086374 A1* | 3/2021 | Brandt .................. B25J 9/1664 |

FOREIGN PATENT DOCUMENTS

| | | |
|---|---|---|
| DE | 102009040145 A1 | 3/2011 |
| DE | 102014226914 A1 | 6/2016 |
| DE | 102017001298 A1 | 8/2017 |
| DE | 102017002603 A1 | 9/2017 |
| EP | 1366867 A2 | 12/2003 |
| EP | 2292388 A1 | 3/2011 |
| EP | 1906281 B1 | 4/2011 |

OTHER PUBLICATIONS

J -P Merlet, "Interval Analysis and Robotics", Robotics Research, Berlin, Heidelberg, Springer Berlin Heidelberg, (Jan. 1, 2011), vol. 66, pp. 147-156, doi:10.1007/978-3-642-14743-2_13, ISBN 978-3-642-14742-5, XP055548199 [A] 4,5 * pp. 1,9*.

European Patent Office; Search Report in related International Patent Application No. PCT/EP2018/079082 dated Feb. 4, 2019; 3 pages.

European Patent Office; Written Opinion in related International Patent Application No. PCT/EP2018/079082 dated Feb. 4, 2019; 8 pages.

German Patent Office; Examination Report in related German Patent Application No. 10 2017 010 599.5 dated Oct. 23, 2018; 6 pages.

Chinese Patent Office; Office Action in related Chinese Patent Application No. 201880074076.5 dated Nov. 16, 2022; 11 pages.

* cited by examiner

METHOD AND SYSTEM FOR SIMULATING A BRAKING OPERATION OF A ROBOT

CROSS-REFERENCE TO RELATED APPLICATIONS

This application is a national phase application under 35 U.S.C. § 371 of International Patent Application No. PCT/EP2018/079082, filed Oct. 24, 2018 (pending), which claims the benefit of priority to German Patent Application No. DE 10 2017 010 599.5, filed Nov. 15, 2017, the disclosures of which are incorporated by reference herein in their entirety.

TECHNICAL FIELD

The present invention relates to a method and a system for simulating a braking operation of a robot, and to a computer program product for carrying out the method.

BACKGROUND

EP 1 906 281 B1 discloses a method in which a braking distance is calculated in each case for a number of selectable points on a specified movement path of a robot, which braking distance connects said point to a standstill point, and, taking into account the braking distances, a virtual movement range is calculated which includes the maximally achievable positions, for the robot, from the movement path.

SUMMARY

The object of the present invention is that of improving the operation of a robot.

This object is achieved by a method and a system or a computer program product for carrying out the method as described herein.

According to one embodiment of the present invention, in the case of a method for simulating a braking operation of a robot, one final state range (in each case) having a plurality of possible final states of the robot, is determined for (at least) an initial state, as a result of the simulated braking operation, using a dynamic model of the robot, and in one embodiment using just one simulation (in each case) of the braking operation.

As a result, in one embodiment variations, in particular tolerances, can be taken into account in parameters of the robot, and as a result the meaningfulness and/or reliability of the simulation, and thus in particular of an interpretation of the robot and/or its surroundings that is based thereon, can be improved. Thus, for example, friction characteristics of joints and/or drives, as well as braking torques of in particular mechanical robot brakes, in particular holding brakes, vary fairly significantly. Accordingly, the meaningfulness or reliability of a virtual movement range, which is calculated, in EP 1 906 281 B1, only on the basis of individual standstill points, is limited.

In one embodiment, the robot comprises a robot arm comprising at least three, in particular at least six, and in one embodiment at least seven, (movement) axes or joints. In a development the robot comprises in particular electrical, and in one embodiment electromotive, drives for moving said axes, and/or in particular mechanical(ly acting) brakes, in particular holding brakes, for braking, in particular securing, said axes.

In one embodiment, the dynamic model describes poses of the robot and/or of the first and/or higher time derivatives thereof, and in one embodiment it links these to in particular driving, braking, weight, friction forces and/or forces that are external (to the robot), in one embodiment in particular in the form of differential equations, in the present case, for the purpose of more compact illustration, opposingly parallel force pairs and torques are also referred to, in a general manner, as forces. Accordingly, in one embodiment, simulation of a braking operation comprises in particular numerically solving said differential equations or calculating passages of time of the poses of the robot and/or of the first and/or higher time derivatives thereof. In one embodiment, a pose of the robot can comprise, in particular be, a position of one or more axes of the robot, and/or a position and/or location of a reference fixed to the robot, in particular a Tool Center Point (TCP) of the robot.

In one embodiment, the final state range can comprise, in particular be, a standstill pose range having a plurality of possible standstill poses of the robot, the robot not moving or being stationary in a or the standstill pose(s), in one embodiment. Standstill poses can be particularly relevant in particular for designing the robot and/or the surroundings thereof, in particular safety devices of its surroundings.

Similarly, in one embodiment, the final state range can also comprise, in particular be, a movement pose range having a plurality of possible movement poses of the robot, the robot (in each case) continuing to move or not being stationary in a movement pose, in one embodiment. It is thus possible for example, in one embodiment, for a braking operation to be simulated for a specified (braking) time, and thus for a range of possible movement states, in particular (residual) speeds, of the robot to be determined upon said time elapsing.

In one embodiment, the standstill pose range is predicted, in particular extrapolated, on the basis of a movement pose of the robot during the simulated braking operation, in which the robot is still moving, and a specified map which associates different movement poses, in particular different pairs of movement poses and speeds, with standstill pose ranges, having a plurality of possible standstill poses, in each case, in particular in the form of a function, a characteristic map, specified deviations, or the like.

As already explained, in the present case a movement pose is in particular understood to be a pose of the robot in which said robot is (still) moving or is not (yet) standing still.

In one embodiment, a speed of the robot, in particular of one or more of the axes thereof and/or of a reference fixed to the robot, in particular the TCP thereof, in the movement pose, on the basis of which the standstill pose range is predicted or on the basis of which the specified map assigns the standstill pose range, is in a specified range which, in a development, is at most 10%, in particular at most 1%, of a (corresponding) maximum possible or permissible speed, and/or is at least 0.1° per second or 1 mm per second.

Thus, in one embodiment, the standstill pose range is determined not on the basis of a simulated standstill pose, but instead on the basis of a movement pose simulated before, during the (simulated) braking operation, which the specified mapping then associates with the standstill pose range. In one embodiment, the simulation can be interrupted upon reaching a specified minimum speed or the specified range for the (simulated) speed, and in another embodiment it can also be continued until reaching a simulated standstill pose.

It is thus possible for a simulation time to be reduced, in one embodiment. In addition or alternatively thereto, in one embodiment a meaningfulness and/or reliability can be improved, in particular because numerical errors, influences of deviating parameter values and the like, can increase significantly until a standstill pose is reached.

In one embodiment, in or for the simulation, a variation, in particular tolerance, range is specified for at least one parameter of the dynamic model, and in a development in each case one variation, in particular tolerance, range is specified for two or more parameters of the dynamic model. In one embodiment, a parameter of this kind may comprise, in particular be, a friction parameter, in particular of a joint of the robot, and/or an in particular maximum, minimum or average braking torque of a brake of the robot.

As a result, in one embodiment, variations, in particular tolerances, can be taken into account in parameters of the robot, and as a result the meaningfulness and/or reliability of the simulation, and thus in particular of an interpretation of the robot and/or its surroundings that is based thereon, can be improved.

In one embodiment, the braking operation can in each case be simulated using or for (a) different value(s), from the specified variation range(s), and thus the final state or standstill pose range can be determined.

In one embodiment, the braking operation is simulated using interval arithmetic for the parameter or for one or more of the parameters of the dynamic model, for which (in each case) a variation range is specified. In this case, interval arithmetic is understood in particular to be arithmetic as described for example in R. E. Moore: Interval Analysis, Prentice-Hall, Englewood Cliff, N.J. 1966, ISBN 0-13-476853-1, and/or according to IEEE Standard 1788-2015, i.e. in particular as arithmetic in which the addition of two parameters x, y, for which one variation range $[x_1, x_2 > x_1]$ or $[y_1, y_2 > y_1]$ is specified in each case, is defined by $[x_1+y_1, x_2+y_2]$.

It is thus possible, in one embodiment, for a simulation time to be reduced. In addition or alternatively thereto, in one embodiment a meaningfulness and/or reliability can be improved.

In one embodiment, for at least two of the possible final states of the determined final state range, in particular one or two extreme final states of the determined final state range, a design variable that is dependent thereon, in particular a kinetic energy of the robot and/or a parameter of a safety device of surroundings of the robot, is determined in each case.

Thus, in one embodiment, the robot and/or the surroundings thereof, in particular a safety device, in one embodiment a safety range, a safety fence or the like, can be designed on the basis of the determined final state range and the design variable(s) determined therefor.

It is thus possible, for example, for a specified braking time, for a range of possible movement states, in particular (residual) speeds, and corresponding kinetic energies, of the robot to be determined upon said time elapsing, and for a safety fence, in particular the type and/or material thereof, to be designed accordingly. In the same way, it is possible, for example, for a standstill pose range of possible standstill poses of the robot at the end of the braking operation to be determined, for at least one initial state, and for a safety range, in particular the size and/or shape thereof, to be designed accordingly.

In one embodiment, for a plurality of initial states of the robot, in each case, in the manner described herein, one final state range comprising a plurality of possible final states of the robot, owing to a simulated braking operation, is determined, and a design variable that is dependent on said final states, in particular a kinetic energy of the robot and/or a parameter of a safety device of surroundings of the robot, is determined.

Thus, in one embodiment, the robot and/or the surroundings thereof, in particular a safety device, in one embodiment a safety range, a safety fence or the like, can be designed on the basis of the determined final state ranges and the design variable determined therefor.

It is thus possible, for example, for a range of possible standstill poses to be determined, in each case, for different initial poses and/or speeds, and for a safety range, in particular the size and/or shape thereof, to be designed accordingly.

Accordingly, the present invention in particular also relates to a method or system for designing (a safety device of) surroundings of the robot, in particular of a safety fence and/or safety range. In one embodiment, designing may comprise, in particular be, creation and/or modification and/or checking of the existing or designed robot, or (an) existing or designed (safety device of) surroundings of the robot.

In one embodiment, in the (simulated) braking operation at least one, in one embodiment exactly one, axis of the robot is braked (in a simulated manner). In addition or alternatively thereto, in one embodiment, during the (simulated) braking operation, in particular (already) during or in the initial state, or during the entire braking operation, at least one, in one embodiment all further, axis/axes of the robot are stationary, and in one embodiment are in one position (in each case) which maximizes the kinetic (initial) energy of the robot.

In other words, in one embodiment a standstill pose range is determined for at least one overrun of the robot.

According to one embodiment of the present invention, a system is designed, in particular in terms of hardware and/or software, in particular in terms of programming technology, to carry out a method described herein, and/or comprises:
means for determining a final state range comprising a plurality of possible final states of the robot, for an initial state of the robot, as a result of the simulated braking operation.

In one embodiment, the system or the means thereof comprises/comprise:
means for predicting the standstill pose range on the basis of a movement pose of the robot during the simulated braking operation, in which the robot is still moving, and a specified map which associates different movement poses with standstill pose ranges, having a plurality of possible standstill poses, in each case; and/or
means for specifying a variation range for at least one parameter of the dynamic model; and/or
means for simulating the braking operation is simulated using interval arithmetic for the at least one parameter of the dynamic model; and/or
means for determining, for at least two of the possible final states of the determined final state range, a design variable that is dependent thereon, in particular a kinetic energy of the robot and/or a parameter of a safety device of surroundings of the robot, in each case; and/or
means for determining, for a plurality of initial states of the robot, in each case one final state range comprising a plurality of possible final states of the robot, owing to a simulated braking operation, and a design variable that is dependent on said final states, in particular a kinetic energy of the robot and/or a parameter of a safety device of surroundings of the robot.

A means, within the meaning of the present invention, can be designed so as to be hardware-based and/or software-based, and can in particular comprise an in particular digital processing unit, in particular microprocessor unit (CPU), which is preferably in data or signal connection with a memory and/or bus system, and/or one or more programs or program modules. The CPU can be designed to process commands that are implemented as a program stored in a memory system, to detect input signals from a data bus, and/or to emit output signals to a data bus. A memory system may comprise one or more, in particular different, storage media, in particular optical, magnetic, solid state, and/or other nonvolatile media. The program can be configured such that it embodies or is capable of executing the methods described herein, such that the CPU can carry out the steps of such methods. In one embodiment, a computer program product can comprise, in particular be, an, in particular nonvolatile, storage medium for storing a program or having a program stored thereon, execution of said program triggering a system, in particular a computer, to execute a method described herein or one or more of the steps thereof.

In one embodiment, one or more, in particular all, of the steps of the method are performed in a completely or partially automated manner, in particular by the system or the means thereof.

In one embodiment, a range cited here can (in each case) be a range that is open at one end or closed at both ends, in particular an interval that is closed or that is open at one end, or can comprise an upper and/or lower limit, in particular can be specified thereby.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
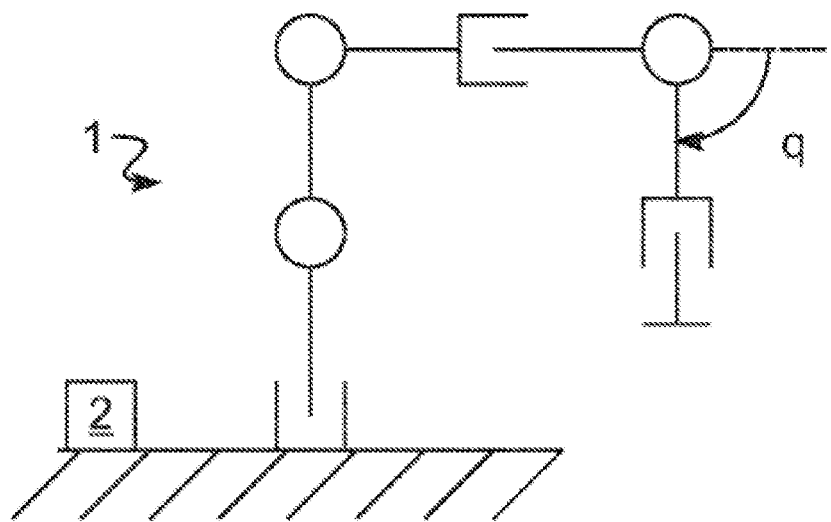
FIG. 1 shows a robot and a system for simulating a braking operation of the robot according to an embodiment of the present invention.
Figure 2:
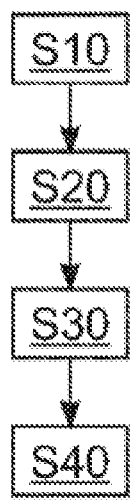
FIG. 2 illustrates a method for simulating the braking operation according to an embodiment of the present invention.

FIG. 1 shows a six-axis robot 1 and a system in the form of a computer 2 for simulating a braking operation of the robot according to an embodiment of the present invention which carries out a method, shown in FIG. 2, for simulating the braking operation according to an embodiment of the invention.

By way of example, braking of an axis is considered, the position of which is indicated in FIG. 1 by a corresponding axial coordinate q.

The equation $$m \cdot l^2 \cdot \ddot{q} = m \cdot g \cdot l \cdot \cos(q) + A - B \cdot \mathrm{sgn}(\dot{q}) - \mu \cdot \dot{q}$$

with mass m, which is assumed to be concentrated in a point that is spaced apart from the axis by the distance l, the gravitational constant g, the drive torque A of the axis, a braking torque B that is direction-dependent owing to the sign function $\mathrm{sgn}(x) = \{1 \Leftrightarrow x>0; -1 \Leftrightarrow x<0; 0 \Leftrightarrow x=0\}$ and a coefficient of friction μ, as well as the first and second time derivation $\dot{q}, \ddot{q}$, is, in simplified terms, a dynamic model of the robot 1.

In a step S10, a variation range $[B_1; B_2>B_1]$ and $[\mu_1; \mu_2>\mu_1]$, respectively, is specified for each of the braking torque B and the coefficient of friction.

Then, in a step S20, a braking operation of the robot 1 is simulated using the dynamic model, up to a standstill, and specifically using interval arithmetic, such that, for example in the case of numerical time integration of the differential equation specified above, an addition B+μ is determined by the interval $[B_1+\mu_1, B_2+\mu_2]$.

Accordingly, in this case, a standstill pose range $[q_1, q_2>q_1]$ results, having a plurality of possible standstill poses $q_i$, for the robot. It is thus possible, for example, for a minimum coefficient of friction $\mu_1$ from the variation range $[\mu_1, \mu_2]$, together with a minimum braking torque $B_1$ from the variation range $[B_1; B_2]$, to lead to a maximum overrun $q_2$ and, vice versa, for a maximum coefficient of friction $\mu_2$ from the variation range $[\mu_1; \mu_2]$, together with a maximum braking torque $B_2$ from the variation range $[B_1, B_2]$, to lead to a minimum overrun $q_1$.

Then, in a step S30, a required safety range is determined, in each case, for the minimum overrun $q_1$ and the maximum overrun $q_2$, and in step S40 a safety range of the robot 1 is constructed, in accordance with the larger of said safety ranges.

In a modification, in step S10 a map Q is specified, which associates different pairs of movement poses $q_k$ and speeds $\dot{q}_p$ of the robot with standstill pose ranges $[q_1(q_k, \dot{q}_p), q_2(q_k, \dot{q}_p)>q:(q_k, \dot{q}_p)]$ having a plurality of possible standstill poses $q_i(q_k, \dot{q}_p)]$, in each case:

$$Q:(q_k,\dot{q}_p) \to [q_1(q_k,\dot{q}_p), q_2(q_k,\dot{q}_p)]$$

for example in the form of specified deviations $$Q:(q_k,\dot{q}_p) \to [q_k - \alpha \cdot \dot{q}_p, q_k + \alpha \cdot \dot{q}_p]$$

having the constant α.

Then, in step S20 of the modification, a braking operation of the robot 1 is again simulated using the dynamic model, but having singular values for the braking torque B and the coefficient of friction μ. As soon as the speeds $\dot{q}$ of the robot are in a specified range approaching standstill, in the simulation, the simulation can be interrupted and, in step S20, the standstill pose range $[q_1; q_2]$ can be predicted on the basis of the current simulated movement pose and the specified map Q.

Thus, for example proceeding from a movement pose $q_E$, in which the speed $\dot{q}_E$ of the robot is in the above-mentioned range for the first time, the standstill pose range $[q_1, q_2]$ results, using the above-mentioned map Q $[q_E - \alpha \cdot \dot{q}_E, q_E + \alpha \cdot \dot{q}_E]$.

Then, in step S30, a required safety range is determined, in each case, for the minimum overrun $q_1$ and the maximum overrun $q_2$, and in step S40 a safety range of the robot 1 is constructed, in accordance with the larger of said safety ranges.

As is in particular clear therefrom, in one embodiment of the present invention, in general the aspect of predicting the standstill pose range on the basis of a movement pose of the robot and a specified map, which associated different movement poses with a plurality of possible standstill poses in each case, and the aspect of the simulation in which a variation range is specified for at least one parameter of the dynamic model, can also be combined, in one embodiment, in the example, for example in that, in step S20, $[B_1; B_2]$ is simulated for the variation ranges $[\mu_1, \mu_2]$, using interval arithmetic, until the speeds $\dot{q}_p$ of the robot are in the specified range, and the standstill pose range $[q_1; q_2]$ is predicted on the basis of movement poses, from the movement pose range determined in the process, and from the specified map Q. Although embodiments given by way of example have been explained in the preceding description, it is noted that a plurality of modifications are possible. It should furthermore be noted that the embodiments given by way of example are merely examples which are not intended to restrict the scope of protection, the applications, and the structure, in any way. Instead, the above description provides guidance for a person skilled in the art to implement at least one embodiment given by way of example, it being possible for various amendments to be made, in particular in view of the function and arrangement of the described components, without departing from the scope of protection as emerges from the claims and the combinations of features equivalent thereto.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS 1 robot
2 computer (system)
q joint angle (pose)

What is claimed is:

1. A method for simulating a braking operation of a robot, the method comprising:
    determining a final state range of the robot out of a plurality of possible final states based on an initial state and a simulated braking operation using a dynamic model of the robot;
    wherein the final state range comprises a standstill pose range defining a plurality of possible standstill poses of the robot;
    wherein the standstill pose range is predicted based on:
        a movement pose of the robot during the simulated braking operation in which the robot is still moving, and
        a specified map that associates different movement poses with standstill pose ranges, each standstill pose range having a plurality of possible standstill poses;
    specifying, during the simulated braking operation, a variation range for at least one parameter of the dynamic model; and
    controlling at least one of a drive or a brake of the robot based on the simulated braking operation.

2. The method of claim 1, wherein the braking operation is simulated by interval arithmetic for at least one parameter of the dynamic model.

3. The method of claim 1, further comprising:
    determining, for at least two of the possible final states of the determined final state range, a design variable that is dependent on the determined final state range.

4. The method of claim 3, wherein the design variable is at least one of:
    a kinetic energy of the robot; or
    a parameter of a safety device in the surroundings of the robot.

5. The method of claim 1, further comprising:
    determining for a plurality of initial states of the robot a corresponding final state range comprising a plurality of possible final states of the robot based on the respective initial state and a simulated braking operation using a dynamic model of the robot; and
    determining a design variable that is dependent on the final states.

6. The method of claim 5, wherein the design variable is at least one of:
    a kinetic energy of the robot; or
    a parameter of a safety device in the surroundings of the robot.

7. The method of claim 1, wherein, during the simulated braking operation, at least one of:
    at least one axis of the robot is braked; or
    at least one axis of the robot is stationary.

8. A system for simulating a braking operation of a robot, the system comprising:
    a robot controller configured to simulate the braking operation of the robot by determining a final state range of the robot out of a plurality of possible final states based on an initial state and a simulated braking operation using a dynamic model of the robot;
    wherein the final state range comprises a standstill pose range defining a plurality of possible standstill poses of the robot;
    wherein the standstill pose range is predicted based on:
        a movement pose of the robot during the simulated braking operation in which the robot is still moving, and
        a specified map that associates different movement poses with standstill pose ranges, each standstill pose range having a plurality of possible standstill poses;
    the robot controller further configured to specify, during the simulated braking operation, a variation range for at least one parameter of the dynamic model, and to control at least one of a drive or a brake of the robot based on the simulated braking operation.

9. The system of claim 8, further comprising:
    a robot having at least three motion axes, a drive associated with each motion axis and configured to actuate motion of the robot about the respective axis, and a brake associated with each motion axis and configured to brake movement of the robot about the respective axis;
    the robot controller controlling at least one of the drives or the brakes based on the simulated braking operation.

10. A computer program product comprising a program code stored on a non-transitory, computer-readable medium, the program code, when executed on a computer, causing the computer to:
    determine a final state range of a robot out of a plurality of possible final states based on an initial state and a simulated braking operation using a dynamic model of the robot;
    wherein the final state range comprises a standstill pose range defining a plurality of possible standstill poses of the robot;
    wherein the standstill pose range is predicted based on:
        a movement pose of the robot during the simulated braking operation in which the robot is still moving, and a specified map that associates different movement poses with standstill pose ranges, each standstill pose range having a plurality of possible standstill poses;
specify, during the simulated braking operation, a variation range for at least one parameter of the dynamic model; and
control at least one of a drive or a brake of the robot based on the simulated braking operation.

* * * * *